(12) United States Patent
Chao et al.

(10) Patent No.: US 7,911,781 B2
(45) Date of Patent: Mar. 22, 2011

(54) ELECTRONIC DEVICE

(75) Inventors: Chien-Chih Chao, Taipei Hsien (TW); Kuei-Yung Cheng, Taipei Hsien (TW)

(73) Assignee: Wistron Corporation, Taipai Hsien (TW)

( * ) Notice: Subject to any disclaimer, the term of this patent is extended or adjusted under 35 U.S.C. 154(b) by 45 days.

(21) Appl. No.: 12/180,699

(22) Filed: Jul. 28, 2008

(65) Prior Publication Data

US 2009/0147477 A1    Jun. 11, 2009

(30) Foreign Application Priority Data

Dec. 6, 2007   (TW) .................................. 96146536

(51) Int. Cl.
*H05K 7/20* (2006.01)
(52) U.S. Cl. .................... 361/679.48; 361/695; 361/697; 361/679.47; 361/679.49; 361/679.54
(58) Field of Classification Search .................. 361/697, 361/695, 679.47, 679.48, 679.49, 679.54
See application file for complete search history.

(56) References Cited

U.S. PATENT DOCUMENTS

| | | | | |
|---|---|---|---|---|
| 4,931,904 A * | 6/1990 | Yiu | ................ | 361/695 |
| 5,772,500 A * | 6/1998 | Harvey et al. | ................ | 454/184 |
| 5,862,037 A * | 1/1999 | Behl | ................ | 361/679.49 |
| 5,898,568 A * | 4/1999 | Cheng | ................ | 361/695 |
| 6,034,871 A * | 3/2000 | Cheng | ................ | 361/695 |
| 6,042,474 A * | 3/2000 | Harvey et al. | ................ | 454/184 |
| 6,104,607 A * | 8/2000 | Behl | ................ | 361/679.49 |
| 6,252,770 B1 * | 6/2001 | Yu et al. | ................ | 361/695 |
| 6,328,097 B1 * | 12/2001 | Bookhardt et al. | ................ | 165/104.33 |
| 6,414,845 B2 * | 7/2002 | Bonet | ................ | 361/695 |
| 6,606,254 B2 * | 8/2003 | Yoneda | ................ | 361/799 |
| 6,711,015 B2 | 3/2004 | Syring et al. | ................ | 361/695 |
| 6,754,077 B2 * | 6/2004 | Lo et al. | ................ | 361/700 |
| 6,914,782 B2 * | 7/2005 | Ku | ................ | 361/700 |
| 6,980,434 B2 * | 12/2005 | Ou Yang et al. | ................ | 361/695 |
| 7,126,818 B2 * | 10/2006 | Lu et al. | ................ | 361/695 |
| 7,126,826 B1 * | 10/2006 | Sorensen et al. | ................ | 361/719 |
| 7,184,265 B2 * | 2/2007 | Kim et al. | ................ | 361/679.47 |
| 7,564,681 B2 * | 7/2009 | Chen | ................ | 361/679.49 |
| 7,643,295 B2 * | 1/2010 | Chao et al. | ................ | 361/700 |

FOREIGN PATENT DOCUMENTS

| | | |
|---|---|---|
| TW | 327969 | 3/1998 |
| TW | 529734 | 4/2003 |
| TW | 586653 | 5/2004 |
| TW | I262044 | 9/2006 |

* cited by examiner

*Primary Examiner* — Anatoly Vortman
(74) *Attorney, Agent, or Firm* — Zaretsky Patent Group PC; Howard Zaretsky (57) ABSTRACT

An electronic device includes a housing, a plurality of heat-dissipating fins, and a heat-dissipating fan. The housing defines a receiving space, and an opening communicating the receiving space with the outside environment. The housing includes a power socket disposed in the receiving space. The heat-dissipating fins are disposed in the receiving space. The heat-dissipating fan includes a power plug portion corresponding to the power socket. The heat-dissipating fan is mountable in the receiving space through the opening so as to provide air flow across the heat-dissipating fins. The power plug portion is inserted into the power socket upon insertion of the heat-dissipating fan into the receiving space. The heat-dissipating fan is removable from the housing through the opening for cleaning of the heat-dissipating fan and the heat-dissipating fins.

4 Claims, 12 Drawing Sheets

ELECTRONIC DEVICE

CROSS-REFERENCE TO RELATED APPLICATION

This application claims priority of Taiwanese Application No. 096146536, filed on Dec. 6, 2007.

BACKGROUND OF THE INVENTION

1. Field of the Invention

The invention relates to a heat-dissipating mechanism for an electronic device, more particularly to a heat-dissipating mechanism that is convenient to disassemble and assemble and that is easy to clean.

2. Description of the Related Art

Figure 1:
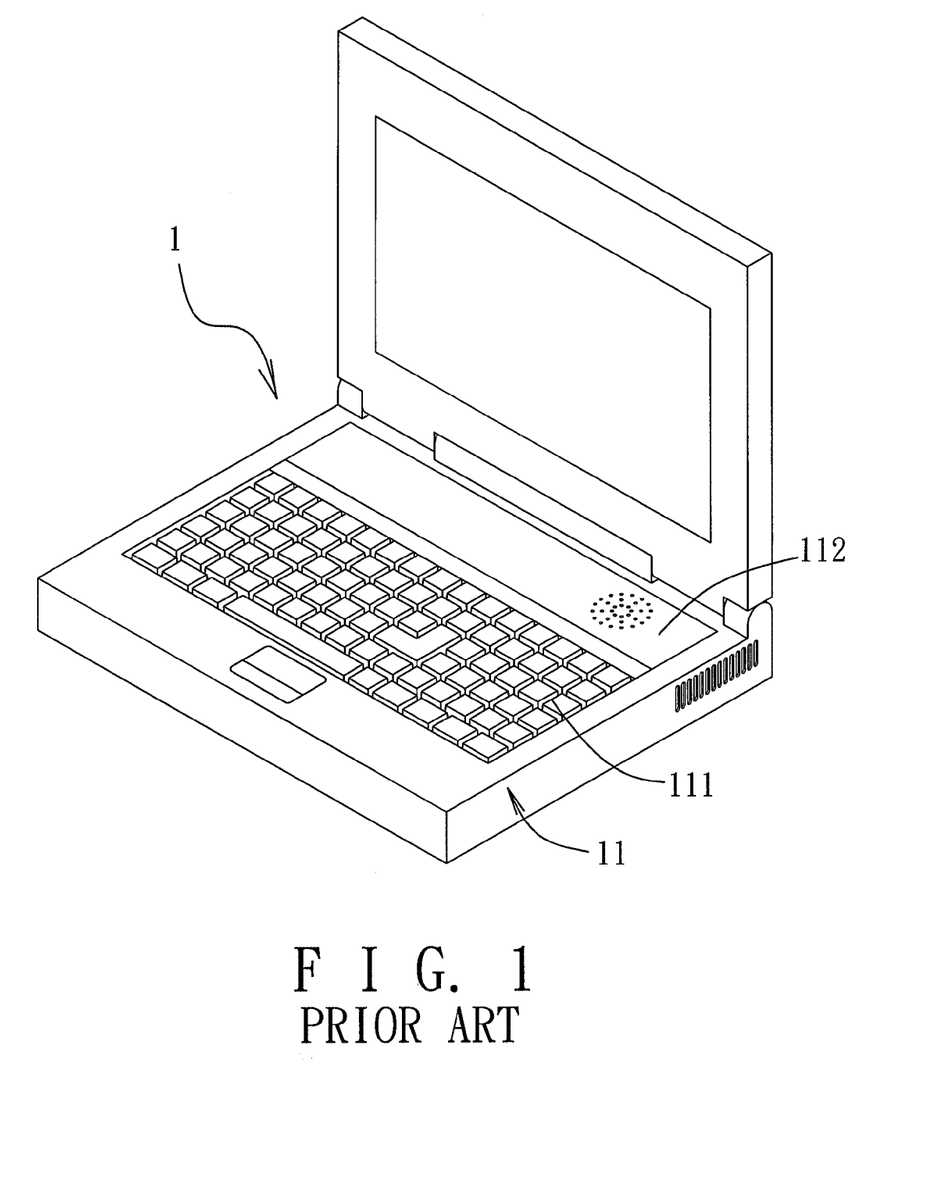
FIG. 1 is a perspective view of a conventional notebook computer.
Figure 2:
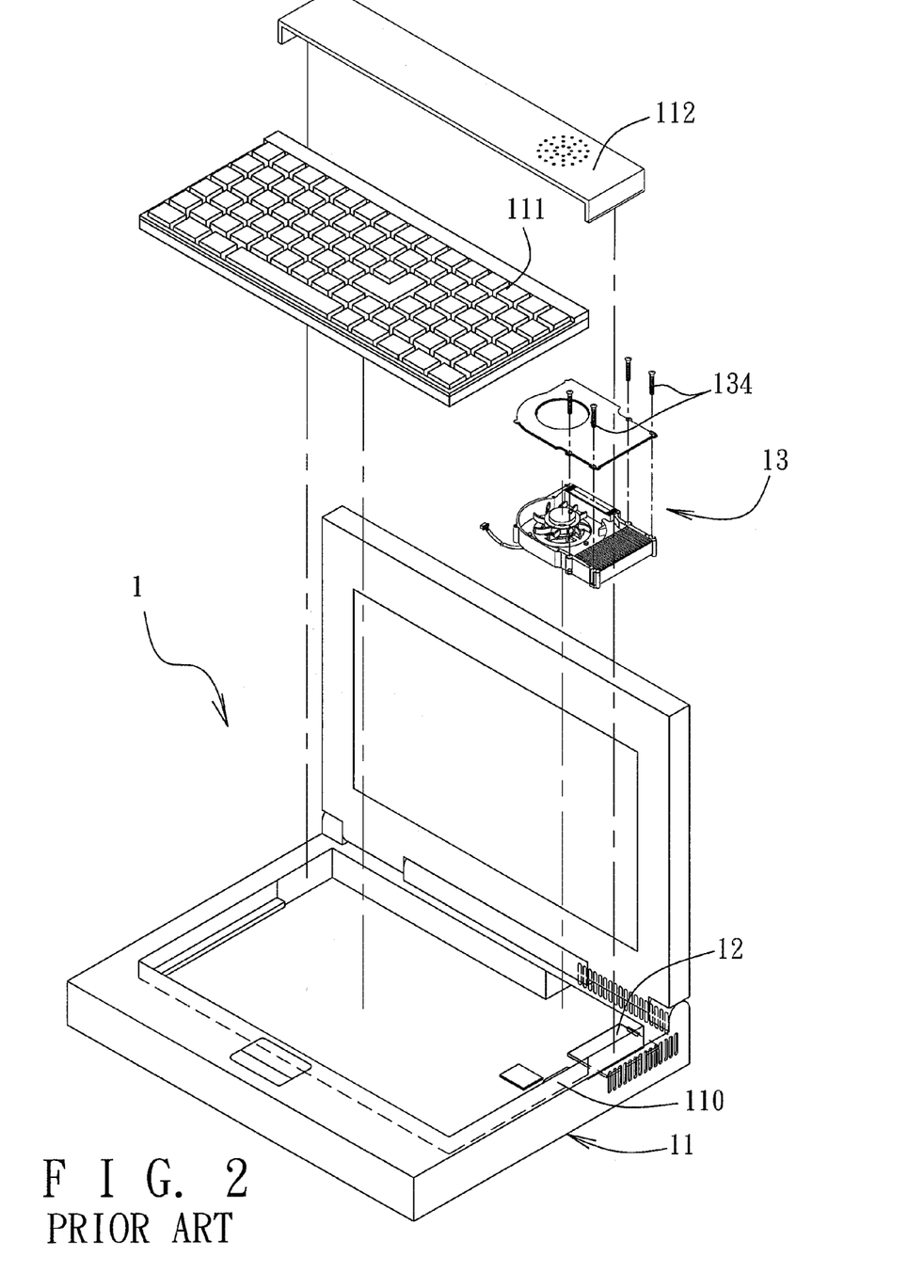
FIG. 2 is an exploded perspective view to illustrate arrangement of a heat-dissipating module in the conventional notebook computer.
Figure 3:
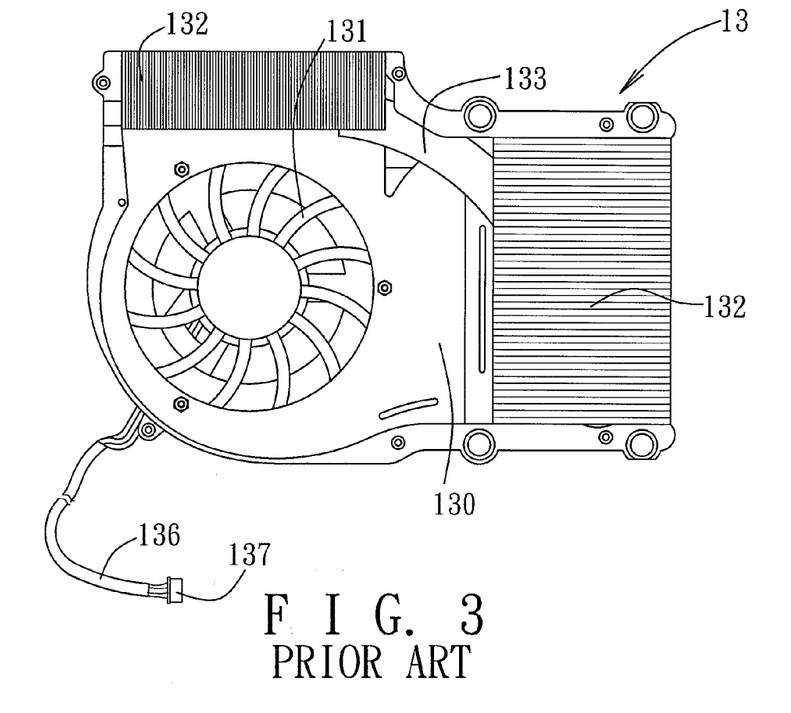
FIG. 3 is a top view of the heat-dissipating module of FIG. 2.

As shown in FIGS. 1, 2 and 3, a heat-generating element 12 (such as a central processing unit or a graphics processing chip) within a housing 11 of a conventional notebook computer 1 will generate a large amount of heat during operation. A heat-dissipating module 13 is therefore required to dissipate the heat generated by the heat-generating element 12 to the outside of the housing 11, so as to prevent crashing of the notebook computer 1 due to the heat. However, since there are dust or suspended particles in the air, when air passes through a fan 131 and heat-dissipating fins 132 of the heat-dissipating module 13, dust will adhere to the fan 131 and the heat-dissipating fins 132. After a period of use of the notebook computer 1, the problem of dust accumulation will aggravate, resulting in blocking of air passages in the heat-dissipating module 13 and obstructed airflow. This in turn results in deterioration of the heat-dissipating efficiency. As a consequence, the notebook computer 1 may crash due to overheating of the heat-generating element 12.

Furthermore, since the temperature of the heat-generating element 12 will continue to rise due to obstructed airflow, a sensing element (not shown) in the notebook computer 1 will cause the fan 131 to operate at an increased rotational speed to increase airflow volume. This will result in a reduction in the service life of the fan 131, and the reliability of the heat-dissipating module 13 is accordingly lowered.

Figure 4:
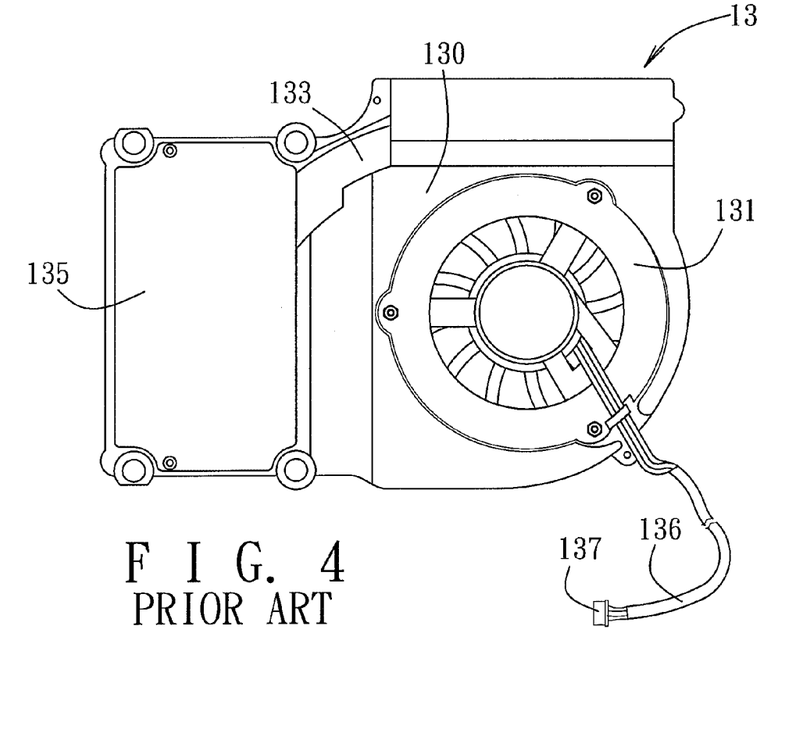
FIG. 4 is a bottom view of the heat-dissipating module of FIG. 2.

The fan 131, the heat-dissipating fins 132, and a heat pipe 133 of the heat-dissipating module 13 are generally disposed within a casing 130. When it is desired to clean the fan 131 and the heat-dissipating fins 132, or the interior of the casing 130, it is necessary to remove the casing 130 of the heat-dissipating module 13 from the housing 11 so that cleaning can be done. During the removal process, it is first necessary to remove a keyboard set 111 and a cover plate 112 from a body 110 of the housing 11 before removing screws 134 to permit removal of the casing 130 of the heat-dissipating module 13. Generally, a heat-dissipating paste (not shown) is applied to a heat-dissipating sheet 135 (see FIG. 4) disposed on a bottom face of the casing 130 and connected to the heat pipe 133 to serve as a heat conducting medium between the heat-dissipating sheet 135 and the heat-generating element 12. Thus, when the casing 130 of the heat-dissipating module 13 is removed from the body 110 of the housing 11, the heat-dissipating paste between the heat-dissipating sheet 135 and the heat-generating element 12 will be damaged. If subsequent handling is not done properly, the heat generated by the heat-generating element 12 cannot be effectively transmitted to the heat-dissipating sheet 135 through the heat-dissipating paste after the heat-dissipating module 13 is re-assembled to the body 110 of the housing 11, thereby resulting in poor heat dissipation. Moreover, since it is necessary for the heat-dissipating sheet 135 to exert a certain pressure on the heat-generating element 12, if the casing 130 is secured to the body 110 with an insufficient or uneven force, contact between the heat-dissipating sheet 135 and the heat-generating element 12 will be defective, which will in turn result in poor heat dissipation. Furthermore, since the fan 131 is connected to a lead wire 136 having a power plug portion 137 provided at a distal end thereof, when the heat-dissipating module 13 is assembled to or removed from the body 110 of the housing 11, it is further necessary to plug or unplug the power plug portion 137 into or from a power socket (not shown) of the body 110 in order to complete assembly or removal of the heat-dissipating module 13, thereby adding to the inconvenience of the removal process.

Since the process of removing the heat-dissipating module 13 from the housing 11 is complicated, cleaning of the fan 131, the heat-dissipating fins 132, and the interior of the casing 130, and replacement of the fan 131 in the event of a malfunction are rather complicated and inconvenient.

SUMMARY OF THE INVENTION

Therefore, an object of the present invention is to provide an electronic device having a heat-dissipating fan that is convenient to assemble and disassemble and that is easy to clean so as to maintain a good heat-dissipating effect.

Other objects and advantages of the present invention can be further appreciated from the technical features disclosed in the present invention.

In order to achieve one or some or all of the aforesaid objects or other objects, an electronic device disclosed in preferred embodiments of the present invention includes a housing, a plurality of heat-dissipating fins, and a heat-dissipating fan.

The housing defines a receiving space, and an opening communicating the receiving space with the outside environment. The housing includes a power socket disposed in the receiving space. The heat-dissipating fins are disposed in the receiving space of the housing. The heat-dissipating fan includes a power plug portion corresponding to the power socket of the housing. The heat-dissipating fan is mountable in the receiving space of the housing through the opening so as to provide a heat-dissipating air current to the heat-dissipating fins. The power plug portion is coupled to the power socket upon insertion of the heat-dissipating fan into the receiving space.

In one embodiment of the present invention, the housing includes a first coupling unit, and the heat-dissipating fan includes a second coupling unit coupled to the first coupling unit.

In one embodiment of the present invention, the housing includes a horizontal first base wall, and a second base wall extending upwardly from one side of the first base wall. The opening is formed in the second base wall. The heat-dissipating fan includes a first sidewall coupled to the second base wall.

In one embodiment of the present invention, the housing further includes a barrier plate extending upwardly from the first base wall and spaced apart from the second base wall. The heat-dissipating fan further includes a second sidewall disposed opposite to the first sidewall and abutting against the barrier wall. The power socket is provided on and projects from the barrier plate. The power plug portion is provided on the second sidewall.

In one embodiment of the present invention, the first base wall has a guide groove extending to the opening.

The heat-dissipating fan further includes a guide rail connected slidably to the guide groove.

In one embodiment of the present invention, the first coupling unit has a retaining groove formed in an outer surface of the second base wall, and a screw hole formed in the second base wall. The second coupling unit has a tab formed on the first sidewall to engage the retaining groove, and a screw. The tab has a through hole formed therein and corresponding to the screw hole. The screw extends through the through hole to engage the screw hole.

In one embodiment of the present invention, the housing includes a horizontal first base wall, and a second base wall extending upwardly from one side of the first base wall. The opening is formed in the first base wall. The housing further includes a cover plate coupled to the first base wall to cover the opening.

In one embodiment of the present invention, the housing further includes a barrier plate extending upwardly from the first base wall and spaced apart from the second base wall. The power socket is provided on and projects from the barrier plate. The power plug portion is disposed on a top face of the heat-dissipating fan.

In one embodiment of the present invention, the second base wall has an inner surface, and a stop tab provided on and projecting from the inner surface. The top face of the heat-dissipating fan abuts against the stop tab.

In one embodiment of the present invention, the second base wall further has a guide rail provided on and projecting from the inner surface and extending to the opening. The heat-dissipating fan further includes a first sidewall abutting against the second base wall, and a guide groove disposed in the first sidewall and coupled slidably to the guide rail.

In one embodiment of the present invention, the cover plate is locked screwably to the first base wall.

In the embodiments of the electronic device according to this invention, by providing the heat-dissipating fins and the heat-dissipating fan separately, and by forming the opening in one of the first base wall and the second base wall, the heat-dissipating fan can be easily and quickly removed from the housing through a lower side or a lateral side of the housing for cleaning of a casing and a fan body of the heat-dissipating fan, and the heat-dissipating fins. Thus, air passages between the heat-dissipating fan and the heat-dissipating fins can be kept clear to ensure smooth flow of air therethrough for maintaining good heat-dissipation.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

In addition, directional terms, such as upper, lower, top, bottom, left, right, front, and rear, are used herein with reference to the orientation of the accompanying drawings. Thus, such directional terms are for purposes of illustration and are in no way limiting.

Figure 5:
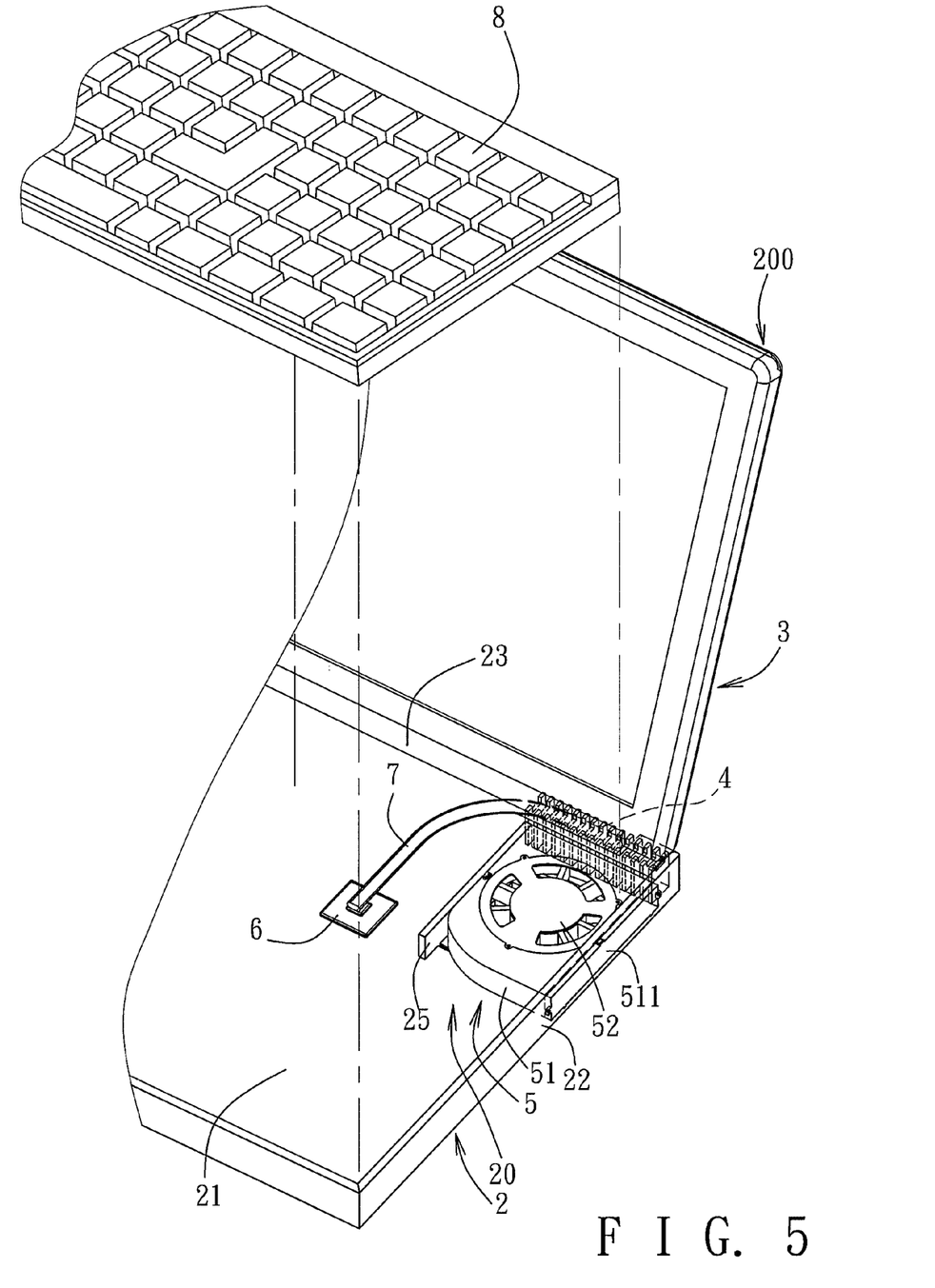
FIG. 5 is a perspective view of the first preferred embodiment of an electronic device according to the present invention.

Referring to FIG. 5, the first preferred embodiment of an electronic device 200 according to the present invention is exemplified to be a notebook computer. The electronic device 200 includes a housing 2, a keyboard 8, a display screen 3 connected pivotally to the housing 2, a plurality of heat-dissipating fins 4, a heat-dissipating fan 5, a heat-generating element 6, and a heat pipe 7. Although the electronic device 200 is exemplified as a notebook computer in this embodiment, the electronic device 200 may be a game console or any other consumer electronic product.

Figure 6:
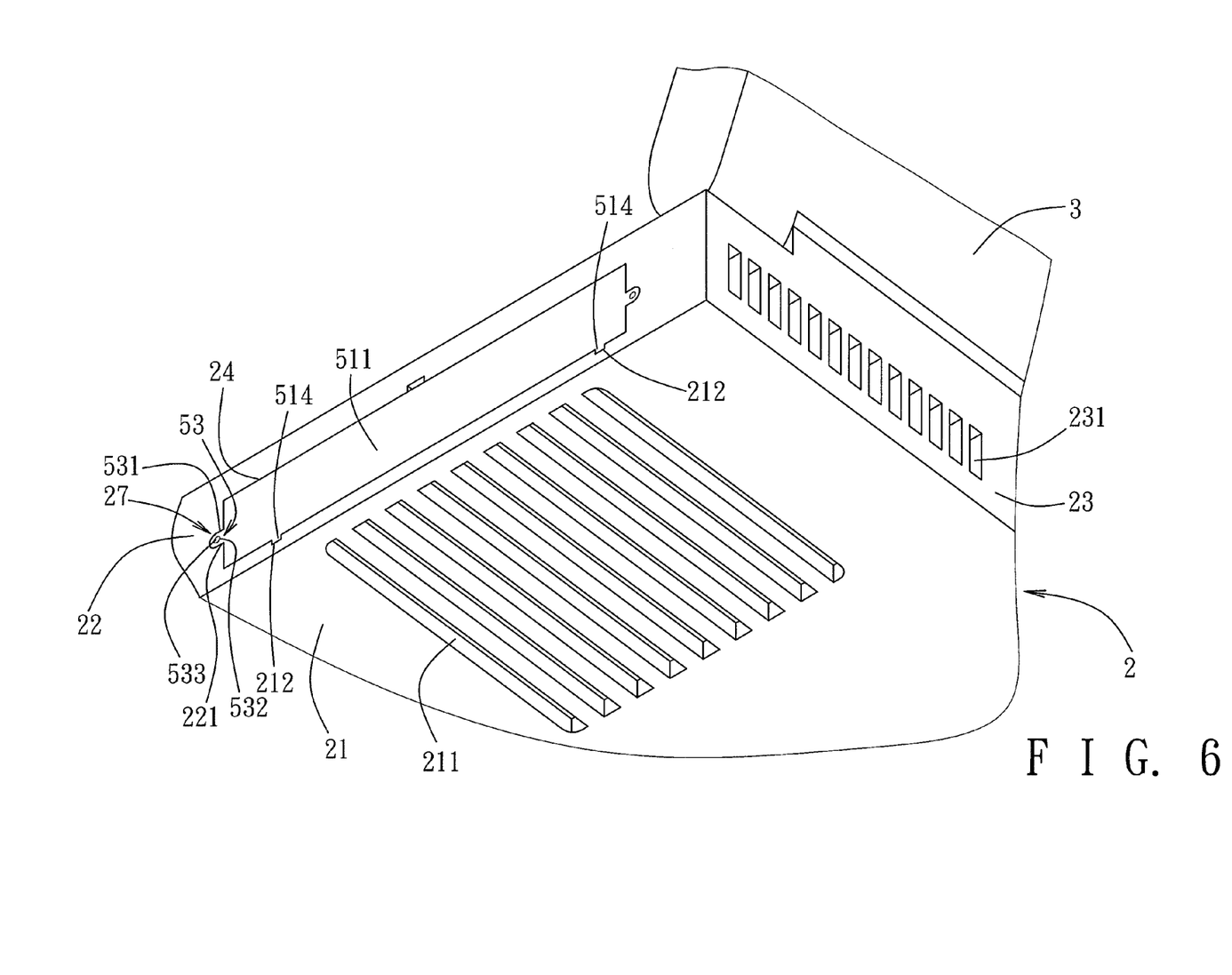
FIG. 6 is a fragmentary bottom perspective view of the first preferred embodiment.
Figure 7:
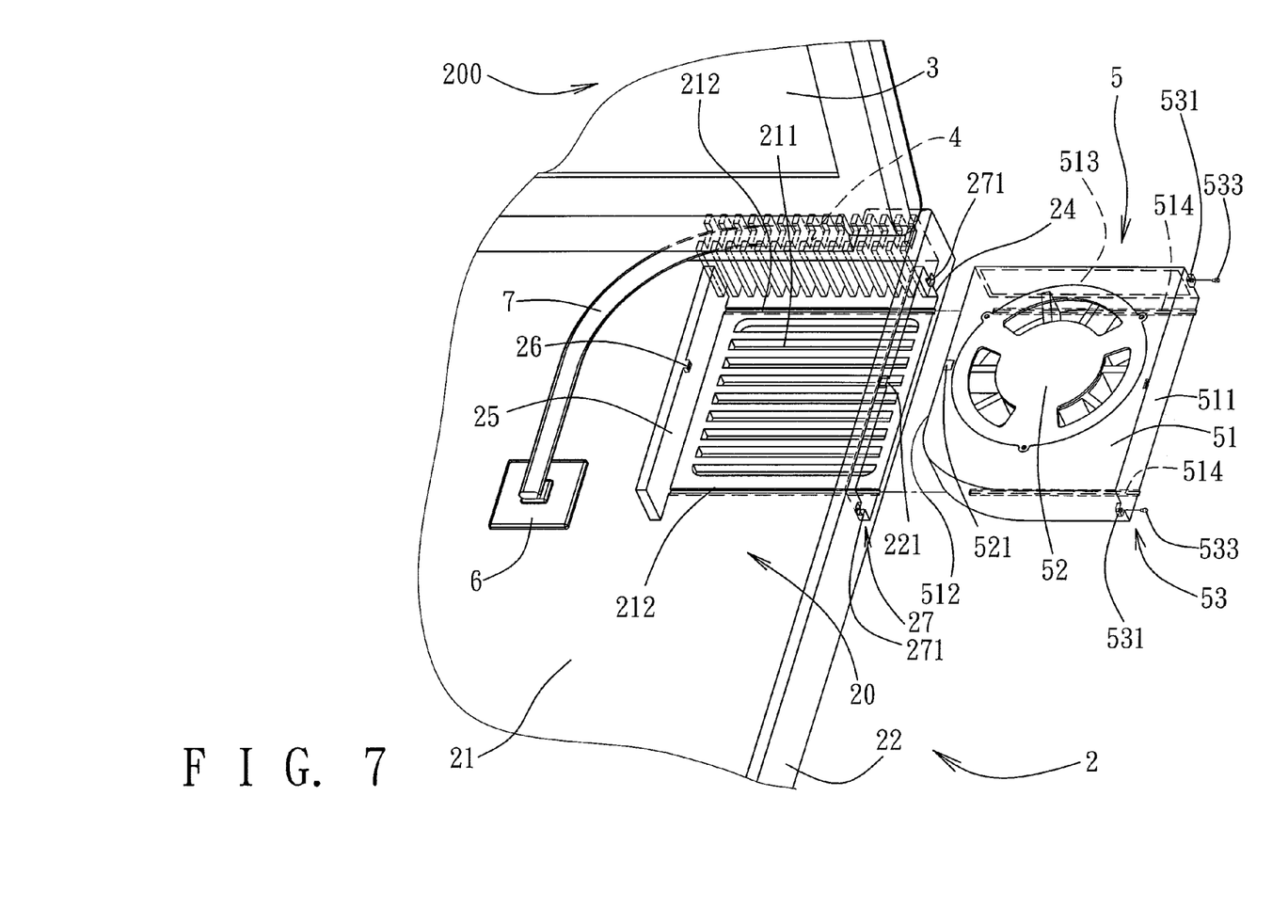
FIG. 7 is an exploded perspective view of the first preferred embodiment to illustrate an assembly relationship between a housing and a heat-dissipating fan.

As shown in FIGS. 5, 6 and 7, the housing 2 includes a horizontally extending first base wall 21, a second base wall 22 adjacent to the first base wall 21, a third base wall 23 adjacent to the first base wall 21, an opening 24, and a receiving space 20. The second base wall 22 extends upwardly from a right side of the first base wall 21. The third base wall 23 extends upwardly from a rear side of the first base wall 21, and is connected to the second base wall 22. The first base wall 21, the second base wall 22, and the third base wall 23 cooperatively define the receiving space 20. The first base wall 21 has a plurality of air inlets 211 adjacent to the second base wall 22 and the third base wall 23. The third base wall 23 has a plurality of air outlets 231 disposed rearwardly of the air inlets 211. The opening 24 is formed in the second base wall 22 and is adjacent to the third base wall 23 such that the receiving space 20 can communicate spatially with the outside environment. Thus, the heat-dissipating fan 5 may be mounted in the receiving space 20 or removed from the housing 2 through the opening 24 when necessary.

The housing 2 further includes a barrier plate 25 extending upwardly from the first base wall 21 and spaced apart from the second base wall 22, and a power socket 26 provided on and projecting from a right side face of the barrier plate 25. A lengthwise extending direction of the barrier plate 25 is the same as a lengthwise extending direction of the second base wall 22 such that the heat-dissipating fan 5 may abut against the barrier plate 25. The first base wall 21 has two spaced-apart guide grooves 212 that extend from the barrier plate 25 to the opening 24. The two guide grooves 212 are respectively disposed at front and rear sides of the air inlets 211 to slidably connect with the heat-dissipating fan 5.

The heat-generating element 6 is disposed on the first base wall 21, and is exemplified as a central processing unit in this embodiment. The heat-dissipating fins 4 are disposed in front of the third base wall 23, between the air inlets 211 and the air outlets 231 and adjacent to the opening 24. Through the arrangement of the heat pipe 7 between a top side of the heat-generating element 6 and the heat-dissipating fins 4, heat generated by the heat-generating element 6 during operation can be conducted to the heat-dissipating fins 4 via the heat pipe 7. In addition, the heat-generating element 6 may be a graphics processing chip or any electronic component that will generate a large amount of heat during operation.

The heat-dissipating fan 5 is disposed on the first base wall 21, and is located above the air inlets 211. The heat-dissipating fan 5 includes a casing 51 and a fan body 52 mounted in the casing 51. The casing 51 has a first sidewall 511 disposed on a right side, a second sidewall 512 disposed on a left side, an air vent 513 disposed at a rear side, and two guide rails 514 disposed on and projecting from a bottom face thereof to slidably engage the guide grooves 212 in the first base wall 21. The fan body 52 has a power plug portion 521 provided on the second sidewall 512 and corresponding in position to the power socket 26 on the barrier plate 25. In addition, the housing 2 further includes a first coupling unit 27 provided on the second base wall 22. The heat-dissipating fan 5 further includes a second coupling unit 53 to couple with the first coupling unit 27. The first coupling unit 27 has two retaining grooves 271 formed in an outer surface of the second base wall 22, and two screw holes 272 (see FIG. 9) formed in the second base wall 22. The second coupling unit 53 has two tabs 531 formed on the first sidewall 511 to engage the two retaining grooves 271 respectively, and two screws 533. Each of the tabs 531 has a through hole 532 (see FIG. 9) that corresponds to a respective one of the screw holes 272. Each of the screws 533 extends through a respective one of the through holes 532 to threadedly engage a respective one of the screw holes 272.

When the heat-dissipating fan 5 is mounted on the first base wall 21, the second sidewall 512 of the casing 51 abuts against the right side face of the barrier plate 25, the power plug portion 521 of the fan body 52 is inserted into the power socket 26 on the barrier plate 25, and the tabs 531 on the first sidewall 511 engage the retaining grooves 271. By inserting the screws 533 through the through holes 532 to engage the screw holes 272, the heat-dissipating fan 5 can be locked to the second base wall 22, thereby securing the heat-dissipating fan 5 in the receiving space 20 of the housing 2. Thus, the fan body 52 of the heat-dissipating fan 5, when operated, can draw in air through the air inlets 211 in the first base wall 21 to provide air flow to the heat-dissipating fins 4 through the air vent 513 so as to carry the heat generated by the heat-dissipating fins 4 out of the housing 2 through the air outlets 231.

Figure 8:
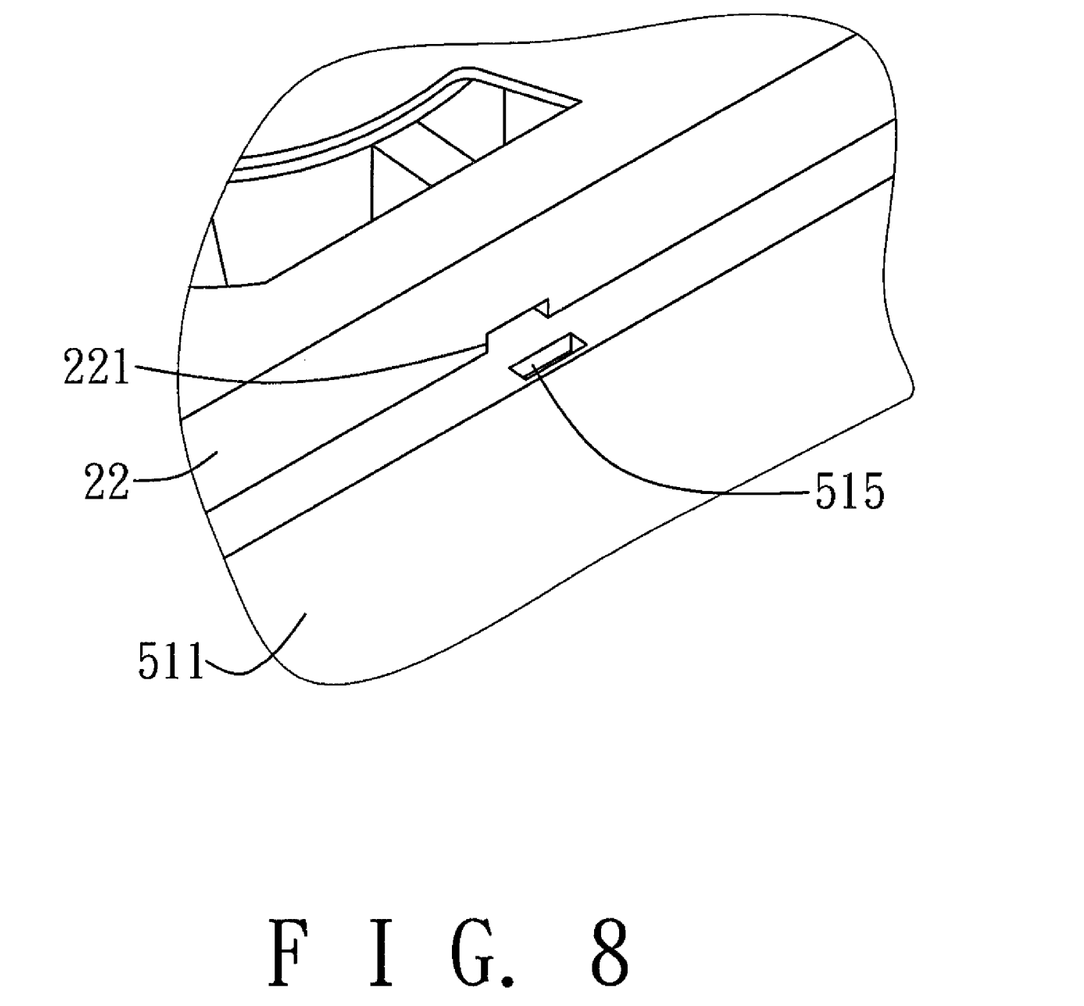
FIG. 8 is a fragmentary enlarged view of the first preferred embodiment.
Figure 9:
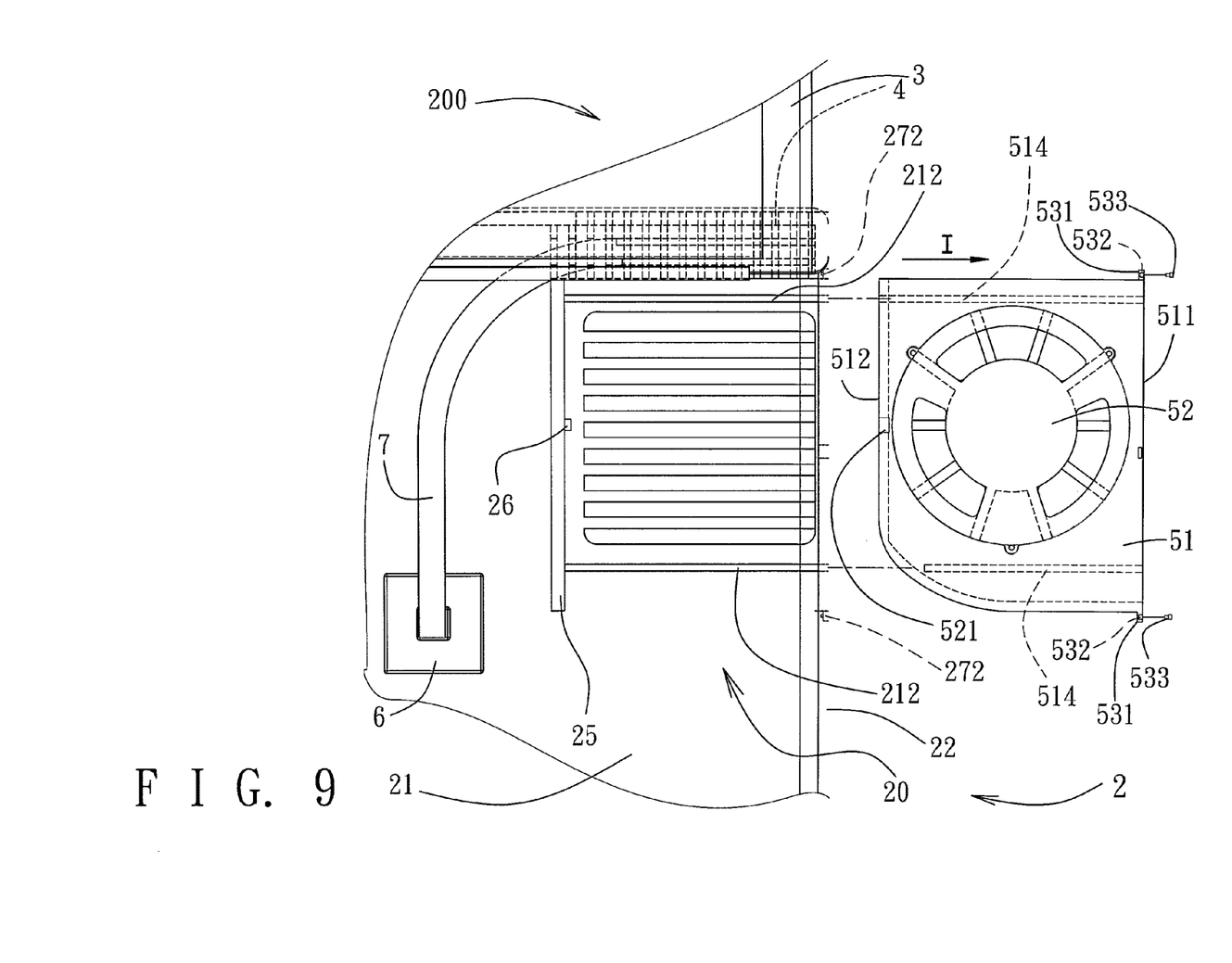
FIG. 9 is a fragmentary top view of the first preferred embodiment to illustrate how the heat-dissipating fan is pulled out from the housing through an opening.

As shown in FIGS. 5, 8 and 9, if the electronic device 200 has been used for a period of time, so that dust in the air has accumulated on the heat-dissipating fan 5 and the heat-dissipating fins 4 to a certain extent, the heat-dissipating fan 5 can be removed from the housing 2 to permit cleaning of the heat-dissipating fan 5 and the heat-dissipating fins 4. First, the screws 533 are loosened and removed. Due to the provision of a slot 515 in a top face of the casing 51 that corresponds to a notch 221 provided in the second base wall 22, the user can insert a finger or a tool into the slot 515 to pull the heat-dissipating fan 5 outwardly in a direction indicated by the arrow (I) (see FIG. 9) so that the guide rails 514 move slidably along the guide grooves 212 in the first base wall 21. When the heat-dissipating fan 5 is completely removed from the housing 2, the user can clean the casing 51 and the fan body 52 of the heat-dissipating fan 5, and the heat-dissipating fins 4 so as to remove the dust that accumulated on the casing 51, the fan body 52, and the heat-dissipating fins 4.

After cleaning, the user can push the heat-dissipating fan 5 back into the receiving space 20 of the housing 2 through the opening 24 in the second base wall 22 in a direction opposite to that indicated by the arrow (I), so that the guide rails 514 of the heat-dissipating fan 5 move slidably along the guide grooves 212 in the first base wall 21 inwardly of the second base wall 22. When the second sidewall 512 of the casing 51 abuts against the barrier plate 25, the power plug portion 521 of the fan body 52 will be inserted into the power socket 26. Subsequently, by fastening the tabs 531 to the second base wall 22 using the screws 533, assembly of the heat-dissipating fan 5 to the housing 2 is completed.

Through separate design of the heat-dissipating fins 4 and the heat-dissipating fan 5, and the arrangement of the opening 24 in the second base wall 22, the heat-dissipating fan 5 can be disassembled from or assembled to the housing 2 easily and quickly to facilitate removal of dust on the heat-dissipating fan 5 and the heat-dissipating fins 4 and to facilitate replacement or upgrading of the fan body 52. Thus, air passages between the heat-dissipating fan 5 and the heat-dissipating fins 4 can be kept clear to ensure a smooth flow of air therethrough for maintaining good heat dissipation. In addition, since disassembly or assembly of the heat-dissipating fan 5 from or to the housing 2 will not affect the coupling between the heat-generating element 6 and the heat pipe 7, the problem of poor heat dissipation resulting from poor contact between the heat-generating element 12 (see FIG. 2), and the heat-dissipating module 13 (see FIG. 2), after the latter is re-assembled to the housing 11 (see FIG. 2) in the aforementioned prior art can be eliminated. Furthermore, since the power plug portion 521 of the fan body 52 is disposed on the second sidewall 512 of the casing 51, during the process of mounting or removing the heat-dissipating fan 5, the power plug portion 521 can be quickly connected to or disconnected from the power socket 26, thereby further enhancing the convenient removal and mounting of the heat-dissipating fan 5.

It is particularly noted that, in this embodiment, although the opening 24 is provided in the second base wall 22, the opening 24 may also be provided in the third base wall 23 or in a base wall opposite to the second base wall 22 depending on the position of the heat-dissipating fins 4. In addition, the heat-dissipating fan 5 may be coupled slidably to the first base wall 21 with the provision of only one guide groove 212 in the first base wall 21 and only one guide rail 514 on the heat-dissipating fan 5. Moreover, each of the retaining grooves 271 in the first coupling unit 27 and the tabs 531 of the second coupling unit 53 may be one in number. Furthermore, the manner of coupling between the first coupling unit 27 and the second coupling unit 53 is not limited to that disclosed in this embodiment. For example, snap fastening and other manners of coupling may also be adopted.

Figure 10:
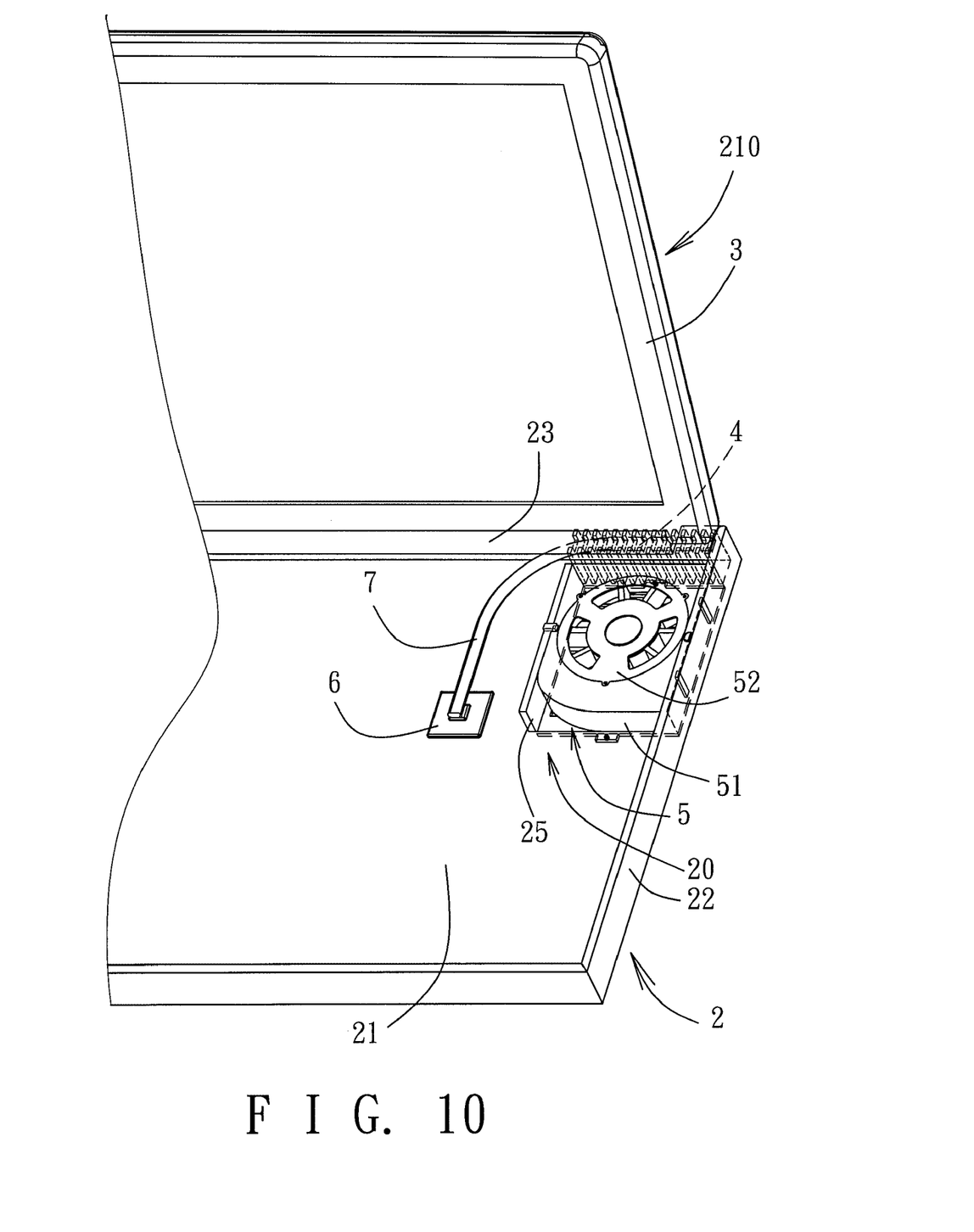
FIG. 10 is a perspective view of the second preferred embodiment of an electronic device according to the present invention.

Referring to FIG. 10, the second preferred embodiment of an electronic device 210 according to this invention is substantially similar to the first preferred embodiment in structure. However, the disassembly between the heat-dissipating fan 5 and the housing 2 is different from that disclosed in the first preferred embodiment.

Figure 11:
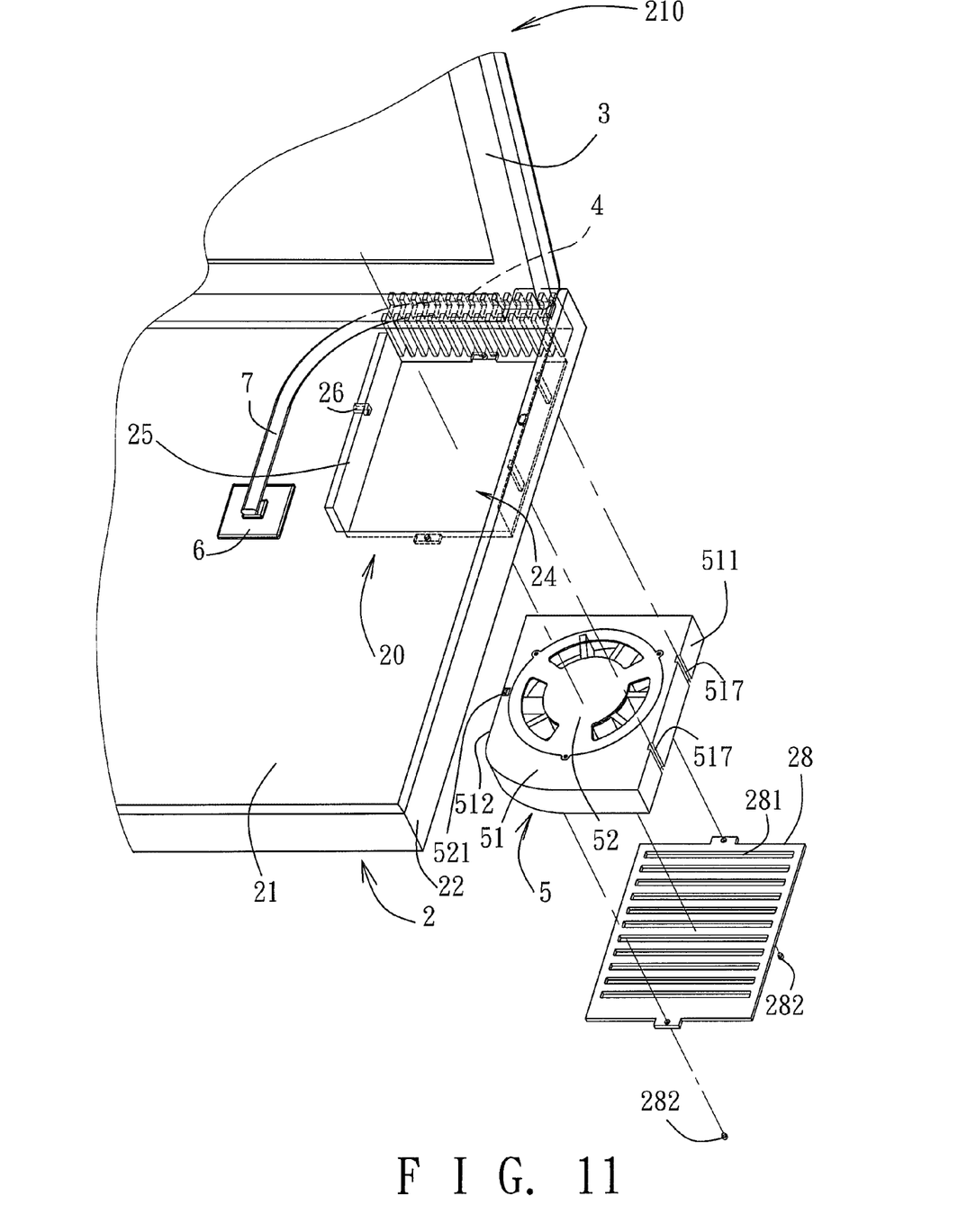
FIG. 11 is an exploded perspective view of the second preferred embodiment to illustrate an assembly relationship between a housing and a heat-dissipating fan.
Figure 12:
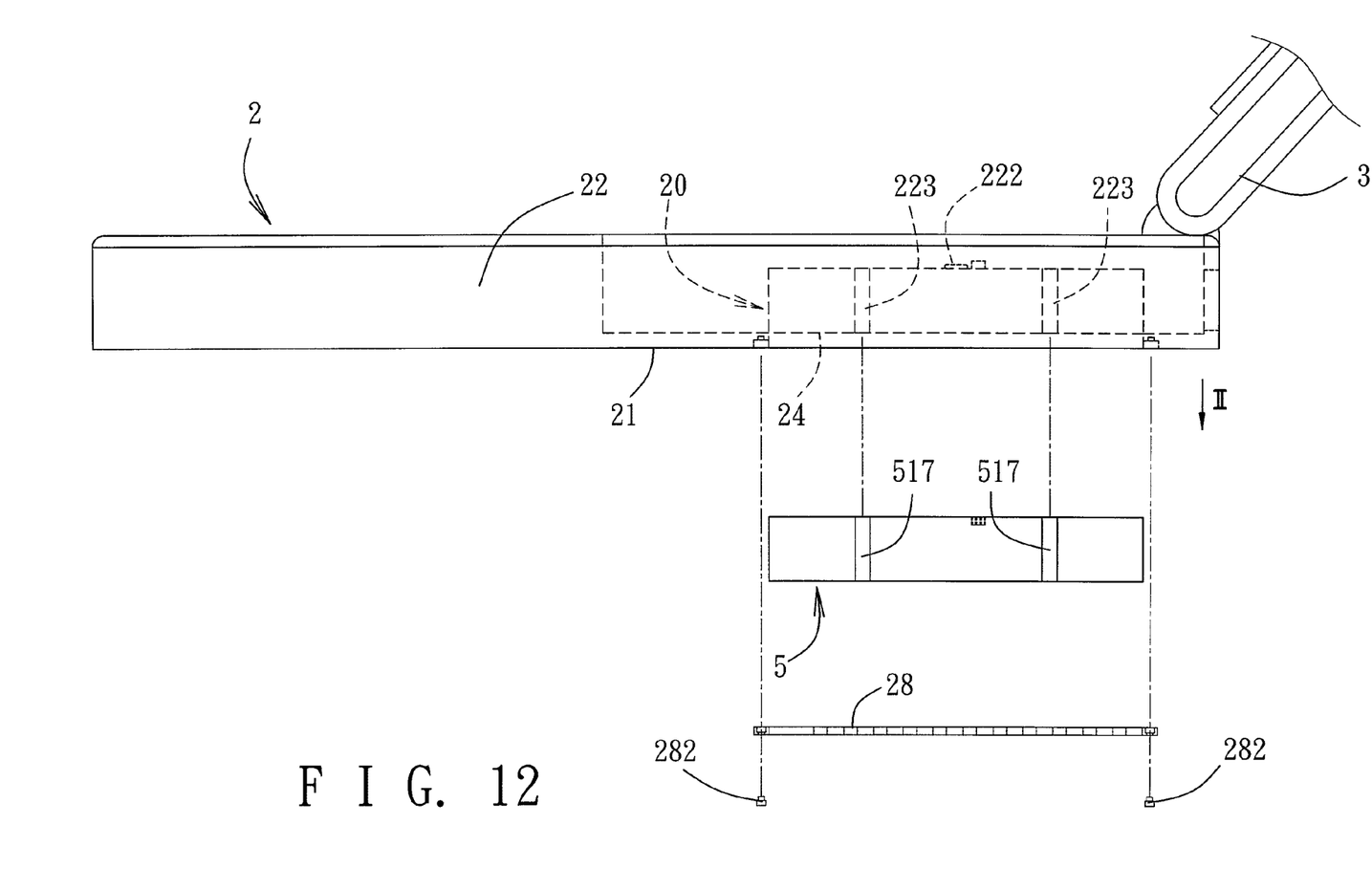
FIG. 12 is a side view of the second preferred embodiment to illustrate how the heat-dissipating fan is pulled out from the housing through an opening.
Figure 13:
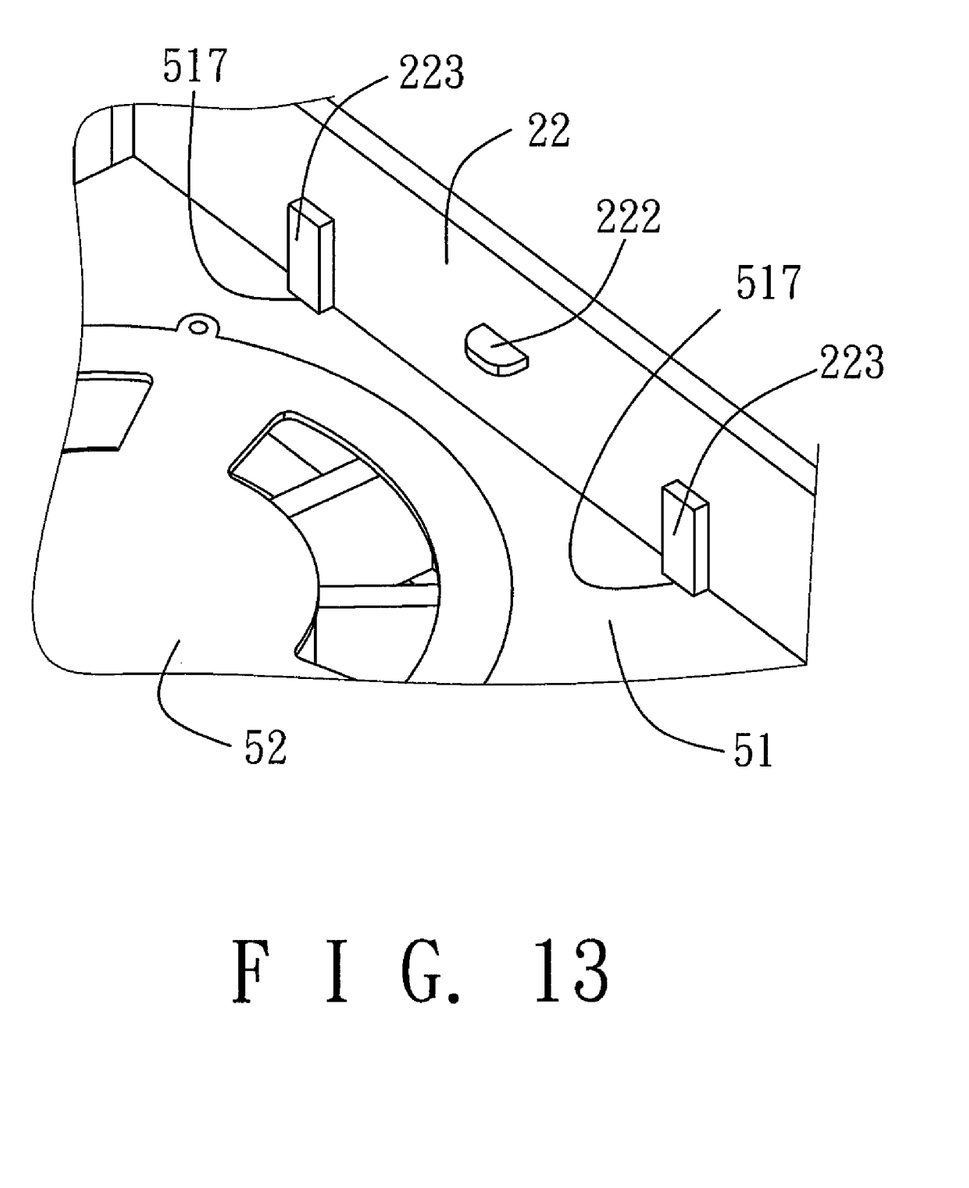
FIG. 13 is a fragmentary enlarged view of the second preferred embodiment.

Referring to FIGS. 11, 12, and 13, in the second preferred embodiment, the opening 24 of the housing 2 is formed in the first base wall 21, and is located between the barrier plate 25 and the second base wall 22 and forward of the heat-dissipating fins 4. The housing 2 further includes a cover plate 28 coupled to the first base wall 21. The cover plate 28 is provided with a plurality of air inlets 281. The cover plate 28 is secured onto the first base wall 21 using screws 282 so as to cover the opening 24. The second base wall 22 has a stop tab 222 projecting from an inner surface thereof, and two guide rails 223 projecting from the inner surface and extending to the opening 24. The two guide rails 223 are disposed respectively at front and rear sides of the stop tab 222. The heat-dissipating fan 5 is disposed on the cover plate 28, and the top face of the casing 51 of the heat-dissipating fan 5 abuts against the stop tab 222. The first and second sidewalls 511, 512 of the casing 51 abut respectively against the inner surface of the second base wall 22 and the right side face of the barrier plate 25. In addition, the first sidewall 511 is provided with two guide grooves 517 to slidably engage the guide rails 223.

When it is desired to remove the heat-dissipating fan 5 from the housing 2 for cleaning of the heat-dissipating fan 5 and the heat-dissipating fins 4, the screws 282 are first loosened and removed, and the cover plate 28 is separated from the first base wall 21. The heat-dissipating fan 5 can then be pulled downward in a direction indicated by the arrow (II) shown in FIG. 12, so that the heat-dissipating fan slides downward along the guide rails 223 on the second base wall 22. When the heat-dissipating fan 5 is completely removed from the housing 2, the user can clean the casing 51 and the fan body 52 of the heat-dissipating fan 5, and the heat-dissipating fins 4 to remove the dust that accumulated on the casing 51, the fan body 52, and the heat-dissipating fins 4.

After cleaning, the user may push the heat-dissipating fan 5 back into the receiving space 20 of the housing 2 through the opening 24 formed in the first base wall 21 along a direction opposite to that indicated by the arrow (II), so that the heat-dissipating fan 5 moves slidably along the guide rails 223 on the second base wall 22 inwardly of the first base wall 21. When the top face of the casing 51 abuts against the stop tab 222, the heat-dissipating fan 5 is prevented from moving any further, and the power plug portion 521 on the top face of the casing 51 of the heat-dissipating fan 5 is inserted into the power socket 26 on the barrier plate 25. Subsequently, by locking the cover plate 28 to the first base wall 21 using the screws 282, assembly of the heat-dissipating fan 5 to the housing 2 is completed.

It is particularly noted that, although the opening 24 is provided in the first base wall 21 in this embodiment, the opening 24 may be disposed in another base wall (i.e., the base wall covering the top face of the heat-dissipating fan 5) opposite to the first base wall 21, such that the heat-dissipating fan 5 can be pulled upward to be removed from the housing 2.

In sum, by providing separate heat-dissipating fins 4 and the heat-dissipating fan 5, and by forming the opening 24 in one of the first base wall 21 and the second base wall 22, the heat-dissipating fan 5 can be easily and quickly removed from the housing 2 through a lower side or a lateral side of the housing 2 for cleaning of the casing 51 and the fan body 52 of the heat-dissipating fan 5, and the heat-dissipating fins 4. Thus, air passages between the heat-dissipating fan 5 and the heat-dissipating fins 4 can be kept clear to ensure a smooth flow of air therethrough for maintaining good heat-dissipation.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An electronic device comprising:
a housing defining a receiving space and an opening communicating said receiving space with the outside environment, said housing including a power socket disposed in said receiving space;
a plurality of heat-dissipating fins disposed in said receiving space of said housing;
a heat-dissipating fan including a power plug portion corresponding to said power socket of said housing, said heat-dissipating fan being mountable in said receiving space of said housing through said opening so as to provide a single air flow channel across said heat-dissipating fins, said power plug portion being coupled to said power socket upon insertion of said heat-dissipating fan into said receiving space;
wherein said heat-dissipating fan is mounted within said receiving space of said housing such that air outside said housing is pulled in through a plurality of air inlets and an air supply opening, is blown across said heat dissipating fins and exhausted out of said housing through an air exhaust opening and a plurality of air outlets, thereby defining said single air flow channel;
wherein said housing includes a first coupling unit, said heat-dissipating fan including a second coupling unit coupled to said first coupling unit;
wherein said housing includes a horizontal first base wall, and a second base wall extending upwardly from one side of said first base wall, said opening being formed in said second base wall, said heat-dissipating fan including a first sidewall coupled to said second base wall;
wherein said housing further includes a barrier plate extending upwardly from said first base wall and spaced apart from said second base wall, said heat-dissipating fan further including a second sidewall disposed opposite to said first sidewall and abutting against said barrier plate, said power socket being provided on and projecting from said barrier plate, said power plug portion being provided on said second sidewall;
wherein said first base wall includes a guide groove extending to said opening, said heat-dissipating fan further including a guide rail connected slidably to said guide groove; and
wherein said first coupling unit includes a retaining groove formed in an outer surface of said second base wall, and a screw hole formed in said second base wall, and said second coupling unit includes a tab formed on said first sidewall to engage said retaining groove, and a screw, said tab including a through hole formed therein and corresponding to said screw hole, said screw extending through said through hole to engage said screw hole.

2. An electronic device comprising:
a housing defining a receiving space and an opening communicating said receiving space with the outside environment, said housing including a power socket disposed in said receiving space;
a plurality of heat-dissipating fins disposed in said receiving space of said housing;
a heat-dissipating fan including a power plug portion corresponding to said power socket of said housing, said heat-dissipating fan being mountable in said receiving space of said housing through said opening so as to provide a single air flow channel across said heat-dissipating fins, said power plug portion being coupled to said power socket upon insertion of said heat-dissipating fan into said receiving space;

wherein said heat-dissipating fan is mounted within said receiving space of said housing such that air outside said housing is pulled in through a plurality of air inlets and an air supply opening, is blown across said heat dissipating fins and exhausted out of said housing through an air exhaust opening and a plurality of air outlets, thereby defining said single air flow channel;

wherein said housing comprises a horizontal first base wall, and a second base wall extending upwardly from one side of said first base wall, said opening being formed in said first base wall, said housing further including a cover plate coupled to said first base wall to cover said opening;

wherein said housing further includes a barrier plate extending upwardly from said first base wall and spaced apart from said second base wall, said power socket being provided on and projecting from said barrier plate, said power plug portion being disposed on a top face of said heat-dissipating fan; and wherein said second base wall has an inner surface and a stop tab provided on and projecting from said inner surface, said top face of said heat-dissipating fan abutting against said stop tab.

3. The electronic device according to claim 2, wherein said second base wall further has a guide rail provided on and projecting from said inner surface and extending to said opening, said heat-dissipating fan further including a first sidewall abutting against said second base wall, and a guide groove disposed in said first sidewall and coupled slidably to said guide rail.

4. The electronic device according to claim 2, wherein said cover plate is locked screwably to said first base wall.

* * * * *